US010538675B2

(12) United States Patent
Pastena et al.

(10) Patent No.: US 10,538,675 B2
(45) Date of Patent: Jan. 21, 2020

(54) ACRYLIC-PEG OPEN TIME ADDITIVE

(71) Applicant: Columbia Insurance Company, Omaha, NE (US)

(72) Inventors: Gianna Pastena, Flanders, NJ (US); Hrire Gharapetian, Ridgewood, NJ (US); Navin Tilara, Roseland, NJ (US)

(73) Assignee: Columbia Insurance Company, Omaha, NE (US)

( * ) Notice: Subject to any disclaimer, the term of this patent is extended or adjusted under 35 U.S.C. 154(b) by 60 days.

(21) Appl. No.: 16/011,782

(22) Filed: Jun. 19, 2018

(65) Prior Publication Data

US 2019/0382593 A1    Dec. 19, 2019

(51) Int. Cl.
| | |
|---|---|
| *C09D 5/24* | (2006.01) |
| *C08F 20/18* | (2006.01) |
| *C08L 71/08* | (2006.01) |
| *C09D 107/02* | (2006.01) |
| *C09D 5/02* | (2006.01) |

(52) U.S. Cl.
CPC ............ *C09D 5/024* (2013.01); *C08F 20/18* (2013.01); *C08L 71/08* (2013.01); *C09D 107/02* (2013.01); *C08F 2500/02* (2013.01); *C08F 2500/03* (2013.01); *C08F 2500/24* (2013.01); *C08L 2201/50* (2013.01)

(58) Field of Classification Search
CPC ......... C09D 5/24; C09D 107/02; C08F 20/18; C08F 2500/02; C08F 2500/03; C08F 2500/24; C08L 71/08; C08L 2201/50
USPC ....................................................... 524/317
See application file for complete search history.

(56) References Cited

U.S. PATENT DOCUMENTS

| | | |
|---|---|---|
| 4,480,053 A | 10/1984 | Sherno |
| 5,270,380 A | 12/1993 | Adamson et al. |
| 6,040,368 A | 3/2000 | Maver et al. |
| 6,303,189 B1 | 10/2001 | Gray et al. |
| 6,610,776 B2 | 8/2003 | Laubender et al. |
| 7,071,261 B2 | 7/2006 | Devonport et al. |
| 7,569,636 B2 | 8/2009 | Tennebroek et al. |
| 7,695,770 B2 | 4/2010 | Dombrowski |
| 8,034,871 B2 | 10/2011 | Bochnik et al. |
| 8,859,684 B2 | 10/2014 | Bakeev et al. |
| 9,790,374 B2 | 10/2017 | Chen et al. |
| 2006/0148980 A1 | 7/2006 | Tielemans et al. |
| 2009/0118397 A1 | 5/2009 | Bloom |
| 2012/0165428 A1 | 6/2012 | Tilara et al. |
| 2014/0005322 A1* | 1/2014 | Akkerman ............ C08F 220/18 524/501 |
| 2016/0333199 A1* | 11/2016 | Akkerman ............ C09D 5/022 |

FOREIGN PATENT DOCUMENTS

WO        0068310 A1    11/2000

OTHER PUBLICATIONS

International Search Report and Written Opinion issued in connection with the corresponding International Application No. PCT/US2019/033479 dated Aug. 14, 2019.

\* cited by examiner

*Primary Examiner* — William K Cheung
(74) *Attorney, Agent, or Firm* — The H.T. Than Law Group

(57) ABSTRACT

Disclosed herein is a polymeric paint additive that increases the open time and the flow and leveling of paint compositions, as well as, maintaining/improving paint film properties such as scrub resistance, water sensitivity, surfactant leaching and stain removal. The polymeric open time additive preferably has a high glass transition temperature, e.g., above 100° C., as determined by the well-known Fox's equation, and molecular weight of less than 20,000 Daltons (number average molecular weight). The particle size of the inventive polymeric open time additive is in the range of about 130 nm to about 230 nm (volume average), prior to being dissolved in a basic solution, such as an aqueous architectural composition.

20 Claims, No Drawings

US 10,538,675 B2

ACRYLIC-PEG OPEN TIME ADDITIVE

FIELD OF THE INVENTION

The present invention is directed to open time extender additives for aqueous latex paint compositions. The paint additives improve open time without negatively affecting dry film properties.

BACKGROUND OF THE INVENTION

The open time of emulsion paint is the time interval during which freshly applied paint can be blended with subsequently applied paint without the appearance of lack of uniformity. Under one approach, open time can be extended by adding volatile organic compounds (VOC) such as glycols into the emulsion paint formulation. However, environmental regulations limit the level of VOCs in paint compositions.

Currently, in many low VOC aqueous paints, open time becomes unacceptably short. Open time problems include, but are not limited to, skinning of left-open paints, not being able to cut back or blend in during brushing and rolling, and non-uniformity of sprayed surfaces. These problems are further exacerbated under fast dry conditions such as low humidity and high temperature.

Some attempts to improve open time involve modifying the aqueous paint composition during the manufacturing process. For example, U.S. Pat. No. 5,270,380 discloses a method for forming an aqueous coating by combining a latex polymer and a modifying compound having complementary reactable groups. U.S. Pat. No. 7,071,261 relates to aqueous paint compositions comprising a dispersion of polymeric nanoparticles that include amine functionality and at least one multi-ethylenically-unsaturated monomer. U.S. Pat. No. 7,569,636 discloses an aqueous coating composition comprising, among other things, a crosslinkable oligomer that provides improved open time and a dispersed polymer (e.g., in the form of a polymer latex) that reduces time to tack free dryness of the composition. U.S. Pat. No. 6,040,368 discloses an aqueous coating composition comprising an emulsion polymer that includes a copolymerized ethylenically unsaturated monomer such as acetoacetoxyethyl methacrylate (AAEM) to improve open time. U.S. Pat. No. 6,610,776 discloses aqueous emulsion paints, where the film forming emulsion latex polymer is copolymerized with a polyethylene glycol or polypropylene glycol to improve open time. US 2007/0249780 concerns a stabilizer composition comprising an uncrosslinked AB type polymer, where the A component can be polyphenoxy glycidyl ether, methylphenyl glycidyl ether, ethylphenyl glycidyl ether and the B component can be polyactalpolyether, acrylate, acrylamide and polyethylene oxide.

Some other attempts to improve open time use polyurethane. U.S. Pat. No. 6,303,189 discloses the addition of an aqueous polyurethane dispersion (PUD) to an aqueous coating composition having at least one film forming latex polymer, which is substantially un-crosslinked. US 2006/0148980 concerns polyurethane and polyurethane/acrylic hybrid dispersions formed from functional polyurethane and vinyl monomers including crosslinking agents to enhance the film formation and fast hardness development of the polyurethane.

Other attempts are directed at paint additives. US 2009/0227705 to Bochnick et al. discloses a latex open time extender wherein the acrylic or vinyl latex particles are polymerized with crosslinkable monomers. The latex particles are less than about 150 nm in size. US 2012/0165428 to Tilara discloses an open time extender comprising a neutralized water-soluble polymer having a hydrophilic, hydrophobic and crosslinkable monomers with a solid content less than about 20 wt. %.

Another method of improving open time involves the use of commercial paint extenders, which a consumer can add to a pre-manufactured aqueous latex paint. One latex-based paint extender on the market is Floetrol®, which is commercially available from the Flood Company of Hudson, Ohio. However, when Floetrol® is added to paints, the aqueous paints still tend to form skins, which are indicative of poor open time. Floetrol® also negatively affects water sensitivity and paint flow leveling. Furthermore, Floetrol® also does not provide compatibility with many commercial low-VOC latex paints since it can cause quick syneresis and separation. Floetrol® also reduces the gloss of higher sheen paints, such as semigloss and high gloss paints. Other commercially available open time additives include WonderWet™ IV and Optifilm™ OT1200. The commercially available open time additives may also negatively affect properties of paint films, such as scrubability and water sensitivity.

Thus, there remains a need for a paint open time extender that in addition to extending open time maintains/improves properties of paint films.

SUMMARY OF THE INVENTION

Hence, one embodiment of the present invention is directed to a polymeric paint additive that increases the open time and the flow and leveling of paint compositions, as well as, maintaining/improving paint film properties such as scrub resistance, water sensitivity, surfactant leaching and stain removal. The polymeric open time additive preferably has a high glass transition temperature, e.g., above 100° C., as determined by the well-known Fox's equation, and molecular weight of less than 20,000 Daltons (number average molecular weight). The particle size of the inventive polymeric open time additive is in the range of about 130 nm to about 230 nm (volume average), prior to being dissolved in a basic solution, e.g., ammonia and water, or in paint compositions with pH higher than 7. Hence, the polymeric paint open time additive is a non-film forming polymer at room temperature (RT) for interior paints or outdoor/environmental temperature for exterior paints. The inventive polymeric open time additive contributes to the film's mechanical properties due to its hardness or high Tg.

An embodiment of the present invention relates to an aqueous latex architectural composition comprising an optional opacifying pigment, a film forming latex resin, and a non-film forming polymeric open time additive. Preferably, the additive has a number average MW from about 7,000 Daltons to about 20,000 Daltons, and a Tg from about 100° C. to about 200° C. and the additive comprises at least one hydrophilic monomer and at least one polymerizable glycol monomer. Preferably, the aqueous latex architectural composition is basic and the additive is dissolved in the aqueous latex architectural composition.

The number average MW of the open time additive may range from about 7,000 Daltons to about 20,000 Daltons, from about 8,000 Daltons to about 15,000 Daltons, or from about 9,000 Daltons to about 13,000 Daltons. The polydispersity index (PDI) may range from about 1.05 to about 1.35, preferably from about 1.10 to about 1.3 or from about 1.15 to about 1.25 or from about 1.10 to about 1.35. The acid number of the open time additive may range from about 130 to about 350, preferably about 180 to about 300, more preferably from about 200 to about 260 or from about 220 to about 250.

The hydrophilicity of the open time additive has a Hansch parameter from about 0.500 to about 1.500, preferably from about 0.750 to about 1.350, more preferably from about 1.000 to about 1.250. Alternatively, the hydrophilicity of the inventive open time polymeric additive is expressed as a weighted solubility at a temperature from 20° C. to 30° C. that ranges from about 30 g/L to about 120 g/L, preferably from about 35 g/L to about 100 g/L and more preferably from about 40 g/L to about 80 g/L.

An acceptable amount or range of solid additive added to the paint composition is about 10 lbs. of solid additive to 100 gallons of paint compositions. This amount of polymeric open time additive can vary from about 30 lbs. to about 60 lbs. per 100 gallons, or 20 lbs. to 70 lbs. per 100 gallons. Preferably, the total amount of the inventive polymeric open time additive (solid) makes up from about 1.5 wt. % to about 2.0 wt. % of the solids in the paint composition, more preferably from about 1.6 wt. % to about 1.9 wt. % or from about 1.65 wt. % to about 1.8 wt. %.

The polymerizable glycol monomer in the open time additive preferably comprises a methoxy polyethylene glycol. The hydrophilic monomer in the open time additive may comprise methyl methacrylate (MMA) monomer and/or methacrylic acid (MAA) monomer.

Another embodiment of the present invention is directed to a copolymer open time emulsion latex comprising a hydrophilic monomer and a polymerizable glycol monomer. Preferably, the latex has a MWn from about 7,000 Daltons to about 20,000 Daltons, a Tg from about 100° C. to about 200° C. and a volume average particle size from about 130 nm to about 230 nm. The latex is dissolvable in a basic aqueous solution.

The volume average particle size may range from about 140 nm to about 220 nm or from about 150 nm to about 210 nm. The ranges of MW, Tg, PDI, acid number and hydrophilicity are the same as those described above and below.

DETAILED DESCRIPTION OF THE PREFERRED EMBODIMENTS

One aspect of the present invention is related to a polymeric open time additive. The inventive polymeric open time additive is an emulsion co-polymer prepared with at least one acrylic monomer, such as methyl methacrylate (MMA), methacrylic acid (MAA), and a polymerizable glycol, such as methoxy polyethylene glycol (MPEG) or polypropylene glycol methyl ether, and a chain transfer agent, such as iso-octylmercaptopropionate (IOMP) to control the additive's molecular weight. MMA (Tg=105° C.; Hansch parameter=1.2751; solubility=15 g/L at 30° C.) and MAA (Tg=228° C.; Hansch parameter=0.9888; solubility=89 g/L at 20° C.) are preferred for their relative high Tg and hardness, as well as for their relative hydrophilicity, as illustrated by their Hansch parameters or their solubility in water (see https://www.ncbi.nlm.nih.gov/pccompound, http://polymerdatabase.com/polymer%20physics/Polymer%20Tg.html). Preferably, MAA monomers form hydrophilic segments in the copolymer additive due to its high hydrophilicity/solubility.

Other monomers that have either high Tg and/or high hydrophilicity/solubility, or both can be included. In one example, a certain amount of styrene monomer (Tg=100° C.; Hansch parameter=2.8950; low solubility), t-butyl methacrylate (Tg=117° C.; Hansch parameter=2.6749; insoluble in water) can be polymerized into the inventive open time additive. In another example, acrylic acid (AA)(Tg=10° C.; Hansch parameter=0.4415; solubility >100 g/L at 63° C.) or itaconic acid (IA)(melting point: 175° C.; Hansch parameter=−0.3434; solubility=76.8 g/L at 20° C.) can be used in place of or in addition to MAA. A preferred polymerizable glycol is MPEG 750, which has 17 units of ethylene oxide (EO) side chains. MPEG with different EO chain lengths can be used, MPEG 250, MPEG 350, MPEG 500, MPEG 1000, MPEG 3000, etc.

The inventive polymeric open time additive is prepared by an emulsification polymerization process with the preferred monomers in the presence of an emulsifier or surfactant and a chain transfer agent, which causes the formation of short polymer chains during polymerization to control the molecular weight. Ammonia can be added to the final latex composition or the ammonia in the paint composition to which the copolymer open time particles are incorporated to neutralize (ionize) the carboxylate groups present on the polymer chains.

The present inventors believe that the hydrophilicity of the inventive open time additive when dissolved in the latex resins or paint compositions lowers the drying rate of the paint compositions resulting in longer open time, improved flow of the applied paint and forming smoother paint films, when compared to conventional paint compositions. The presence of hard segments of the copolymer which comprise methacrylate groups contribute to the final toughness and blocking resistance of the dried paint films. The glycols in the MPEG are copolymerized with the other monomers preventing the volatile organic compounds from escaping into the atmosphere, while contributing to the improved open time.

The present invention is further described in the following examples.

Example A: Polymerization Process without Ammonia Neutralization

In a 5-liter glass reactor, 350 g water and surfactant were combined with stirring. 1.1 g sodium persulfate solution was added to the reactor at 80° C. The monomer pre-emulsion was then added at about 4 g/min. Thirty minutes after monomer addition was complete, the reactor temperature was lowered to 50° C. 0.73 g of an oxidizing agent in 9.1 g water solution and 0.73 g of a reducing agent in 9.1 g water solutions were concurrently fed into the reaction over 30 minutes. The emulsion of copolymer particles was cooled to 30° C. and filtered through a 140-mesh screen. About 1.9 g of biocide or about 0.2 wt. % of total latex is added at this point. The particle size of the inventive copolymer particles is from about 130 nm to about 230 nm (volume average) with a Tg greater than about 100° C. The resulting emulsion copolymer can be added to a paint composition.

Example B: Polymerization Process with Ammonia Neutralization

In a 5-liter glass reactor, 350 g water, surfactant were combined with stirring. 1.1 g sodium persulfate solution was added to the reactor at 80° C. Monomer pre-emulsion was then added at about 4 g/min. Thirty minutes after monomer addition was complete, the reactor temperature was lowered to 50° C. 0.73 g of an oxidizing agent in 9.1 g water solution and 0.73 g of a reducing agent in 9.1 g water solutions were concurrently fed into the reaction over 30 minutes. The emulsion of copolymer particles was cooled to 30° C. About 1.9 g of biocide or about 0.2 wt. % of total latex is added at this point followed by an aqueous ammonia solution. 46 g ammonia mixed with 535 g of water was added under agitation to the latex under agitation, which results in the dissolution of the emulsion polymer and formation of a clear solution. This concentration of ammonia solution is used for 32% or less MAA monomer in the monomer emulsion, more or less ammonia should be used with more or less MAA, respectively.

Example C: Exemplary Formulation of Inventive Open Time Additive

| Component | total (g) | % solids | Amount solids | | |
|---|---|---|---|---|---|
| Deionized water | 320 | 0% | 0 | | |
| Surfactant | 1.00 | 25% | 0.25 | | |
| Sodium persulfate | 1.1 | 100% | 1.136 | | |
| Deionized water | 9.1 | 0% | 0 | | |
| Deionized water | 120 | 0% | 0 | | |
| Surfactant | 16.9 | 25% | 4.23 | | |
| MMA monomer | 158.2 | 100% | 158.2 | 60% | |
| MAA monomer | 105.5 | 100% | 105.5 | 40% | |
| IOMP | 2.00 | 100% | 2 | | 0.75 phr |
| MPEG monomer | 26.4 | 50% | 13.18 | | 5 phr |
| Deionized water rinse | 23 | 0% | 0 | | |
| Oxidizing agent | 0.73 | 100% | 0.727 | | |
| Deionized water | 9.1 | 0% | 0 | | |
| Reducing agent | 0.73 | 100% | 0.727 | | |
| Deionized water | 9.1 | 0% | 0 | | |
| NH$_3$ | 53 | 28% | 0 | | |
| Deionized water | 465 | 0% | 0 | | |
| Biocide | 1.6 | 100% | 0 | | |
| Deionized water | 1.6 | 0% | 0 | | |
| Total Latex: | | | | | |
| total (g) | | | | | 802.55 |
| total (g) solids | | | | | 285.95 |
| % solids = | | | | | 35.63% |
| % surfactant = | | | | | 1.70% |
| total active monomer: | | | | | 263.70 |

Phr: part "per hundred parts of rubber," e.g. 0.75 phr is 0.75 part per 100 parts of total monomers.

The acid number is 240 or 240 milligrams of KOH to neutralize the MAA in the polymeric additive. (105.5 g or 1.226 moles of MAA can be neutralized with 1.226 moles or 68.65 g of KOH; 68.85 g of KOH to neutralize about total 284.4 g of the copolymer yields 0.24 g of KOH.) The acid number may range from about 130 to about 350, preferably about 180 to about 300, more preferably from about 200 to about 260 or from about 220 to about 250.

Preferably, the hydrophilicity of the inventive polymeric open time additive can be expressed by the calculated Hansch parameter or the solubility of the monomers that make up the additive. The calculated Hansch parameter represents an indication of the hydrophobicity of a polymer or copolymer with higher values correlate to higher hydrophobicity. The calculated Hansch parameters are calculated in accordance to the Environmental Protection Agency (EPA)'s Kowwin™ methodology and described in U.S. Pat. No. 7,695,770, which are incorporated herein by reference in their entireties. Kowwin™ "[e]stimates the log octanol-water partition coefficient, log KOW, of chemicals using an atom/fragment contribution method," and is described and downloadable at https://www.epa.gov/tsca-screening-tools/epi-suitetm-estimation-proram-interface.

The calculated Hansch parameter for MAA is 0.9888 and for MMA is 1.2751. The weighted calculated Hansch parameter for the additive in Example C with 40% MAA and 60% MMA is (0.4*0.9888+0.6*1.2751) about 1.1606. Preferably, the hydrophilicity of the inventive open time polymeric additive has a calculated Hansch parameter that ranges from about 0.500 to 1.500, preferably from about 0.750 to about 1.350 and more preferably from about 1.000 to about 1.250. Higher Hansch values indicate greater hydrophobicity.

The hydrophilicity of the inventive polymeric open time additive can also be expressed as a weighted average of the individual monomer's solubility, in the range of 20° C. to 30° C. For Example C with 40% MAA and 60% MMA, the weighted solubility is (0.4*89 g/L+0.6*15 g/L) is about 44.6 g/L. While it is preferable that the solubility be measured at substantially the same temperature, the scientific literature has reported solubility of monomers in water at different temperature. (See https://www.ncbi.nhn.nih.gov/pccompound, which has solubility data for various monomers and other compounds). It is acceptable for the purpose of the present invention to use solubility of monomers in water at any temperature between 20° C. and 30° C. Preferably, the hydrophilicity of the inventive open time polymeric additive has a solubility at 20° C. to 30° C. that ranges from about 30 g/L to about 120 g/L, preferably from about 35 g/L to about 100 g/L and more preferably from about 40 g/L to about 80 g/L.

The molecular weights (Daltons) of several samples of the inventive polymeric open time additive with different amounts of chain transfer agent were measured. The glass transition temperatures or Tg are calculated using the Fox equation.

| IOMP phr | Mn | Mw | Mz | PDI | Tg ° C. |
|---|---|---|---|---|---|
| 0.75 | 11,290 | 13,290 | 15,226 | 1.177 | 134 |
| 1.00 | 12,873 | 15,471 | 18,227 | 1.202 | 134 |
| 1.40 | 12,352 | 16,281 | 20,248 | 1.318 | 134 |
| 2.30 | 9,201 | 11,612 | 13,840 | 1.262 | 134 |

Mn = number average molecular weight,
Mw = mass or weight average molecular weight,
Mz = z-average molecular weight, determined by ultra-centrifugation
PDI = polydispersity Index (Mw/Mn)

The open time additive of the present invention has a number average molecular weight greater than about 7,000 and less than about 20,000, more preferably from about 8,000 to about 15,000, and preferably from about 9,000 to about 13,000 with a PDI from about 1.05 to about 1.35, preferably from about 1.1 to about 1.3 and from about 1.15 to about 1.25 or 1.1 to about 1.35.

The glass transition temperature is preferably greater than 100° C. and less than 200° C., preferably from about 120° C. to about 180° C. and preferably from about 130° C. to about 170° C.

The volume average particle size or diameter of the inventive additive is from about 130 nm to about 230 nm, preferably from about 140 nm to about 220 nm, more preferably from about 150 nm to about 210 nm.

The open time additive of Examples A-C or in the examples discussed hereafter can be added into an exemplary paint composition, as shown below in Example D.

| Composition | Gallons | Pounds |
|---|---|---|
| Water | 10.204 | 85.000 |
| Dispersing Agent | | 10.000 |

-continued

| Composition | Gallons | Pounds |
|---|---|---|
| Emulsifier/dispersing agent | 0.400 | 3.600 |
| Defoamer | | 1.000 |
| Preservative (aqueous dispersion of 1,2-benzisothiazolin-3-one (BIT)) | | 2.000 |
| Mildewcide (Zinc pyrithione and ZnO) | | 2.500 |
| TiO₂ | | 275.000 |
| Hydrous alumino silicate extender | | 35.000 |
| Water | 0.600 | 5.000 |
| Ammonia 26 BE | | 1.750 |
| anionic surfactant | | 1.600 |
| Emulsifier/dispersing agent | 0.389 | 3.500 |
| Opacifying grind - subtotal | 23.592 | 425.950 |
| Water | 9.774 | 81.414 |
| Rheological modifier | | 12.000 |
| Acrylic Latex | | 434.500 |
| Inventive open time additive (Ex. 3) | 3.435 | 28.400 |
| Ammonia 26 BE | | 2.200 |
| Water | 2.401 | 20.000 |
| Commercial open time additive ¶ | | 5.000 |
| Coalescent aid | | 15.000 |
| Defoamer | | 3.000 |
| Rheology Modifier | | 19.000 |
| Fluorosurfactant | | 2.000 |
| Water | 2.404 | 20.027 |
| Water | 1.613 | 13.436 |

¶ An optional small amount of commercial open time additive OT1200 was included in some of the paint examples.

Several inventive polymeric open time additives were made and tested. MMA and MAA were used as the principal monomers with varying amounts of IOMP chain transfer agent and MPEG 750 as the polymerizable glycol open time agent. The control additive sample X does not have the MPEG nor the hydrophilic MAA, but includes a WonderWet IV and Optifilm OT1200 commercial open time additive.

Example E

TABLE 1

| | MMA:MAA:IOMP:MPEG | NH₃:H₂O† | Visc‡ | pH | Solid |
|---|---|---|---|---|---|
| 1 | 78%:22%:1 phr:2 phr | 46:549 | 170 | 7.38 | 15.24% |
| 2 | 68%:32%: 1 phr: 5 phr | 52:405 | high | 7.21 | 19.72% |
| 3 | 78%:22%: 1.4 phr: 5 phr | 38:412 | 3,890 | 7.64 | 20.43% |
| 4 | 68%:32%: 1.4 phr: 2 phr | 48:292 | high | 7.03 | 21.95% |

TABLE 1-continued

| | MMA:MAA:IOMP:MPEG | NH₃:H₂O† | Visc‡ | pH | Solid |
|---|---|---|---|---|---|
| 5 | 68%:32%: 1 phr: 2 phr | 46:354 | high | 6.97 | 21.03% |
| 6 | 68%:32%: 1.4 phr: 5 phr | 60:229 | 8,890 | 7.62 | 23.40% |
| 7 | 78%:22%: 1 phr: 5 phr | 46:640 | 750 | 8.95 | 17.10% |
| 8 | 78%:22%: 1.4 phr: 2 phr | 46:404 | 6,770 | 9.02 | 19.91% |
| X | 53.2% MMA: 43.2% 2-EHA | | | 8.72 | 49.08% |

†grams of ammonia and grams of water to dissolve additive
‡viscosity in cP: "high" is higher than 1500 cP.

phr: part "per hundred parts of rubber," e.g. 0.75 phr is 0.75 part per 100 parts of monomers.

The inventive additives have either 78% MMA and 22% MAA or 68% MMA and 32% MAA, as shown. The additives in Example E may have either 1.0 phr of the chain transfer agent or 1.4 phr. Examples C and G also used 0.75 phr of the chain transfer agent. The different amount of phr would yield a different molecular weight. The amount of polymerizable ethylene glycol (MPEG 750) varies from 2 phr to 5 phr. Example G used a higher amount of polymerizable ethylene glycol. Inventive samples 2, 4, 5 and 6 have higher viscosity than the other inventive samples, possibly due to the higher amount of MAA (32%).

The inventive polymeric open time additives are added to the paints at about 40-50 lbs. to 100 gallons (950 lbs. to 1100 lbs.) of paints depending on the solid content (%) of the additives. This amount of polymeric open time additive can vary from about 30 lbs. to about 60 lbs. per 100 gallons, or 20 lbs. to 70 lbs. per 100 gallons. An acceptable amount or range of solid additive added to the paint composition is about 10 lbs. of solid additive to 100 gallons of paint compositions ±20%, preferably ±10%. The "lbs. per 100 gallons" of aqueous paint compositions unit is commonly used units in the architectural coating industry in the United States.

Preferably, the total amount of the inventive polymeric open time additive (solid) makes up from about 1.5 wt. % to about 2.0 wt. % of the solids in the paint composition, more preferably from about 1.6 wt. % to about 1.9 wt. % or from about 1.65 wt. % to about 1.8 wt. %.

The paint viscosity measured in KU and ICI units and paint pH are substantially within the normal ranges, i.e., 98-103 KU, 1.150-1.300 ICI and 8.3-8.9 pH.

Example E

TABLE 2

| | Open time Draw downs | Surfactant leach test drop/spray (1 d/7 d/1 d/7 d) | Leach total | Stain Scrubs | Stain ttp | Stain litter | MPI stain test (CIE LAB ΔE) C | W | M | K | G | Total |
|---|---|---|---|---|---|---|---|---|---|---|---|---|
| X | 3.0 | 3.0/3.0/4.0/5.0 | 15 | 619 | 0.72 | 0.27 | 0.87 | 3.23 | 1.32 | 0.32 | 0.14 | 5.88 |
| 1 | 3.8 | 3.5/5.0/4.0/5.0 | 17.5 | 585 | 0.46 | 0.45 | 0.50 | 1.26 | 0.41 | 0.32 | 0.42 | 2.91 |
| 2 | 4.9 | 4.0/5.0/4.0/5.0 | 18 | 694 | 0.6 | 0.60 | 0.73 | 1.58 | 0.40 | 0.33 | 0.19 | 3.23 |
| 3 | 4.3 | 3.0/5.0/3.5/5.0 | 16.5 | 513 | 0.65 | 0.29 | 0.88 | 2.84 | 0.83 | 0.27 | 0.21 | 5.03 |
| 4 | 3.5 | 2.0/3.5/3.5/5.0 | 14 | 671 | 0.31 | 0.26 | 1.49 | 2.30 | 1.88 | 0.72 | 0.61 | 7.00 |
| 5 | 3.6 | 3.5/4.0/4.0/5.0 | 16.5 | 600 | 0.33 | 0.32 | 0.86 | 2.34 | 0.92 | 0.93 | 0.70 | 5.75 |
| 6 | 3.4 | 3.0/3.0/4.0/5.0 | 15 | 619 | 0.43 | 0.29 | 0.66 | 1.98 | 0.49 | 0.25 | 0.21 | 3.59 |
| 7 | 3.3 | 3.5/5.0/4.0/5.0 | 17.5 | 578 | 1.74 | 0.30 | 0.73 | 1.90 | 0.85 | 0.40 | 0.29 | 4.17 |
| 8 | 3.5 | 2.5/4.0/3.0/5.0 | 14.5 | 564 | 1.28 | 0.29 | 0.64 | 1.48 | 0.54 | 0.22 | 0.40 | 3.28 |

Table 2 of Example E shows the properties of the paint films formed by paints made with control sample X and inventive samples 1-8 in similar manner as Example D. The test protocols for all the tests discussed herein are discussed toward the end of the present specification. The open time of the inventive samples improved from a 3.0 minute open time for the control sample X for the draw down samples to about 3.5 minutes to 4.9 minutes, which represents a 16.7% to 63.3% improvement. The draw down samples were 3-mil thick and the experiment was conducted once at 51% relative humidity and 72.6° F. and a second time at 47.7% relative humidity and 75° F. and the open times were measured by two observers. Table 2 reports the average of the four readings.

Drops of water and sprays of water were applied to 3-mil draw down panels of the paints made with samples 1-8 and X. Visual inspections after one and seven days were carried out to ascertain whether and how much the surfactants and/or other water-soluble materials had leached from the paint films. The scores were added and reported in Table 2 of Example E. The higher total score indicates lower leaching. As reported, most of the inventive samples 1-8 have similar or better scores than control sample X.

Dried paint films from inventive samples 1-8 have comparable scrubability as control sample X.

In the stain removal tests, ttp black and litter stains are applied to the paint films. The stains are then removed by scrubbing. Thereafter, a color reading with a spectrophotometer is taken over the residual stain. A reading of 1.75 or lower indicates that the residual stain is not visible to the eyes. Only inventive samples 7 and 8 show higher readings with the ttp stain test. The other inventive samples have similar performance as the control sample X in the ttp and litter stain tests.

Inventive samples 1-8 performed as well as and in most cases better than the control sample X in the Master Paint Institute's stain test, which measures how readily stains from common household products, such as hot regular coffee, red cooking wine, tomato ketchup, yellow mustard and graphite, can be removed. The stains are removed and color readings are taken thereafter to determine how much of the stains remain. The total color readings for each sample is added. The higher total reading indicates that stains are harder to remove. Other than inventive sample 4, all other inventive samples outperform the control sample X in the MPI stain test.

Table 3 below shows that the inventive samples 2, 6 and 8 has better flow leveling and open time when applied to doors than control sample X. The open time improvement for the samples is about 1 minute from a 6-minute open time for control sample X, which represents about a 16.5% improvement. Flow leveling measures the smoothness or texture of the paint film on a scale of 1 to 10, with 10 being the smoothest without visible brush strokes or roller patterns.

Example E

TABLE 3

|   | "Door" Open Time (minutes) | Flow Leveling |
|---|---|---|
| X | 6 | 7 |
| 2 | 7 | 8.5 |
| 6 | 7 | 9 |
| 8 | 7 | 8 |

Example F

In this example, one inventive paint sample was compared to three other control samples, including a sample with no open time additive, a sample with commercially available open time additives and a sample with a polymeric open time additive without the polymerizable ethylene glycol. The open time measurements were conducted in an environment of 50.6% relative humidity and 71.9° F.

Example F

TABLE 4

|   | Open time additive§§ | KU:ICI viscosity | RM:AT¶ | Open time (minutes) | Flow leveling |
|---|---|---|---|---|---|
| X-1 | None | 99.4: 1.504 | 35.0 g: 19.4 g | 10 | 9 |
| X-2 | WWIV:OT1200§ | 100.5: 1.108 | 41.4 g: 14.0 g | 10 | 8 |
| X-3 | MMA:MAA† | 99.9: 1.171 | 34.0 g: 16.0 g | 11 | 8 |
| 9 | MMA:MAA:MPEG 750‡ | 99.5: 1.187 | 33.0 g: 14.4 g | 13 | 8.5 |

§Wonderwet ™ IV and Optifilm ™ OT 1200 commercial open time additives.
¶rheological modifier: associated thickener.
†68% MMA, 32% MAA.
‡68% MMA, 32% MAA, 5 phr MPEG and no commercial open time additive.
§§about 10 lbs. (solid) per 100 gallons of paints or about 1.7 wt. % (solid to solid)

As shown, the inventive example 9 has comparable flow leveling property as the other control samples (X-1, X-2 and X-3), and 2-3 minutes longer in open time or about 20% to 30% improvement. The paint film properties of samples X-2, X-3 and 9 are shown below in Tables 5 and 6.

Example F

TABLE 5

|   | Open time | Surfactant leach test drop/spray (1 d/7 d/1 d/7 d) | Leach total | Scrubs | Stain ttp | Stain litter | MPI stain test (CIE LAB ΔE) C | W | M | K | G | Total |
|---|---|---|---|---|---|---|---|---|---|---|---|---|
| X-2 | 10 | 2/3/2/4 | 11 | 878 | 0.6 | 0.25 | 1.83 | 4.38 | 1.03 | 0.17 | 0.04 | 7.45 |
| X-3 | 11 | 2/3.5/2/4 | 11.5 | 986 | 1.75 | 0.16 | 1.52 | 5.54 | 1.08 | 0.16 | 0.12 | 8.42 |
| 9 | 13 | 2.5/3.5/2.5/4.5 | 13 | 946 | 0.68 | 0.48 | 0.98 | 3.41 | 1.01 | 0.19 | 0.04 | 5.63 |

As shown, in addition to better open time the inventive sample 9 also has better surfactant leaching value and comparable scrubability. The ttp and litter stain resistant values are comparable between the inventive sample 9 and the two control samples X-2 and X-3. The MPI stain resistant values of inventive sample 9 is significantly better than the control samples. Other film properties of these three samples are shown below in Table 6.

Example F

TABLE 6

|   | Gloss: sheen | Contrast ratio | Block @ 120° F. | Water sensitivity | Wet adhesion Scratch | Wet adhesion x-hatch | Color transfer | Sag resistance | Flow leveling |
|---|---|---|---|---|---|---|---|---|---|
| X-2 | 64.4/86.8 | 95.88 | 3 | 4/4/3.5 | 3 | 5/5/5 | 1.17 | 10 | 8.5 |
| X-3 | 62.1/86.4 | 96.39 | 3 | 4/4/3 | 3 | 5/5/5 | 0.91 | 12 | 8.5 |
| 9 | 63.2/86.6 | 96.38, 96.55 | 3 | 4/4/3 | 3 | 5/5/5 | 1.97 | 12 | 9 |

The gloss and sheen of the paint films between inventive sample 9 and control samples X-2 and X-3 are comparable. The contrast ratios, which show the opacifying power of the paints, are also comparable. The block resistance, which shows the tendency of painted surfaces to stick to each other, and water sensitivity, which shows the sensitivity of a dried paint film to water, are also comparable. The wet x-hatch adhesion and wet scratch resistance are also comparable. The inventive sample 9 has better sag resistance than control sample X-2, and all samples have similar flow leveling property. Sag is the opposite of flow leveling. Sag indicates that a paint composition is too thin and when applied to a substrate the thin paint composition tends to drip and run. The water sensitivity tests rate the softness of the paint film after 1, 2 and 3 minutes and the x-hatch test rate the paint film at 10 minutes, 30 minutes and 60 minutes. All the tests conducted are described in detail below.

Example G

In this experiment, higher levels of MAA, e.g., 32% and 40%, are used to polymerize the inventive open time additive with two different levels of MPEG, e.g., 5 phr and 8 phr, and with two different amounts of chain transfer agent, e.g., 1 phr and 0.75 phr. Table 7 shows the open time and flow leveling of inventive samples 10, 11, 12 and 13.

Example G

TABLE 7

|   | Open time MMA:MAA:IOMP:MPEG 750 | KU:ICI viscosity | Open time (minutes) | RH:Temp |
|---|---|---|---|---|
| 10 | 60%: 40%: 0.75 phr: 5 phr | 101:1.096 | 11 | 50.8%:72.6° F. |
| 11 | 60%: 40%: 0.75 phr: 8 phr | 100:1.129 | 13 | 49.2%:72.3° F. |

TABLE 7-continued

|   | Open time MMA:MAA:IOMP:MPEG 750 | KU:ICI viscosity | Open time (minutes) | RH:Temp |
|---|---|---|---|---|
| 12 | 68%: 32%: 1.0 phr: 8 phr | 100.7:1.033 | 12 | 47.4%:72.0° F. |
| 13 | 68%: 32%: 1.0 phr: 5 phr | 101.3:1.054 | 9 | 48.5%:72.2° F. |

The amount of open time additive, rheological modifiers and associated thickeners used in Examples 10-13 are similar to those used in Example 9. Samples 10-13 show that higher amounts of the polymerizable glycol tend to increase open time. The paint film properties of inventive samples 10-13 are shown below in Tables 8 and 9.

Example G

TABLE 8

|   | Open time | Surfactant leach test drop/spray (1 d/7 d/1 d/7 d) | Leach total | Scrubs | Stain ttp | Stain litter | MPI stain test (CIE LAB ΔE) C | W | M | K | G | Total |
|---|---|---|---|---|---|---|---|---|---|---|---|---|
| 10 | 11 | 2.5/5/3.5/5 | 16 | 887 | 0.19 | 0.27 | 1.3 | 1.88 | 0.31 | 0.29 | 0.26 | 4.04 |
| 11 | 13 | 3/4.5/3.5/5 | 15.5 | 1074 | 0.16 | 0.26 | 1.09 | 1.98 | 0.03 | 0.04 | 0.01 | 3.15 |
| 12 | 12 | 3/5/3/5 | 16 | 891 | 0.09 | 0.26 | 0.61 | 1.82 | 0.05 | 0.03 | 0.07 | 2.58 |
| 13 | 9 | 3/5/3/5 | 16 | 1003 | 0.11 | 0.22 | 1.01 | 2.3 | 0.41 | 0.1 | 0.05 | 3.87 |

Example G

TABLE 9

|   | Gloss: sheen | Block @ 120° F. | Water sensitivity | Wet adhesion Scratch | Wet adhesion x-hatch | Color transfer |
|---|---|---|---|---|---|---|
| 10 | 54.5/86.3 | 3 | 4/3/2 | 3 | 5/5/5 | 1.10 |
| 11 | 55.6/88.0 | 3 | 4/3/2 | 3 | 5/5/5 | 1.15 |
| 12 | 55.1/87.3 | 3 | 4/3.5/2.5 | 3 | 5/5/5 | 1.25 |
| 13 | 53.9/87.7 | 3 | 4/3.5/2.5 | 3 | 5/5/5 | 1.52 |

The inventors observed that higher amounts of MPEG result in lower MPI stain removal number, which means that it is easier to remove the selected stains. The other paint film properties are similar to those of inventive samples 1-9, shown above.

Experimental Methods

Scrubability test shows the number of scrub cycles before failure and the test is conducted pursuant to ASTM D2486 Method B.

Surfactant Leaching:

surfactants or other water-soluble materials can leach from a paint film and causes a blotchy appearance or tan or brown spots to appear on the paint film when certain environmental conditions exist. Surfactant leaching is a test for probing the extent of exterior water spotting on a coating. The test method for surfactant leaching involved forming 3-mil draw down panels of each coating composition. These panels were then allowed to dry in air at about 72° F. and 50% RH for about 24 hours. Each panel was then held so that the coating on the substrate was oriented vertically, at which point 3-5 drops of water were applied over the coated area. Additionally, water is also sprayed on the panel. Without changing the orientation of the panels, the coatings were allowed to dry for 1 day and 7 days. The presence or absence of visible staining on each panel was noted and rated from 1 to 5, with 1 representing the most visible stain, and with 5 representing no visible stain.

Stain removal testing was also conducted in accordance with ASTM D4828. The samples were drawn down on a black vinyl chart and allowed to dry for 7 days in a constant temperature and humidity room at 72° F. and 50% RH. Stains, TTP-29 (ASTM D3450 black stain) and litter (ASTM 2198) stains, were applied to the film and allowed to stand for 24 hours. Excess stain was gently wiped using laboratory tissue, and then placed upon a Washability tester fitted with a sponge. The sponge was saturated with a 1% solution of Fantastik™ (S. C. Johnson & Son, Inc.) in water, and the film subjected to a scrub cycle until stain was removed. The results include the number of scrubs required to remove the stains.

The MPI stain removal test conducted in these experiments corresponds to the Master Paint Institute (MPI) COR-MTD-119 standard. Higher values indicate that the stains were more difficult to remove from the paint film. Lower values are more preferred. The numbers reported are the sum of the changes in color readings (Delta E values in CIE2000 units) of a pre-stained paint film and post-stained-and-washed paint film after a number of different stains are applied to the paint film. The stains include hot regular coffee, red cooking wine, tomato ketchup, yellow mustard and graphite. The cleaning solution comprises 0.5% nonyl phenoxy ethanol, 0.25% trisodium phosphate (TSP) and 99.25% deionized water. The cleaning solution is applied by a 430 g sponge/holder for 500 cycles. The changes of color caused by each stain are added and reported for each Example. This test is conducted at 72° F. and 50% RH. Alternatively, a less preferred and less stringent stain removal test, MPI COR-MTD-083, can also be used.

Flow leveling describes the textures of the paint film when dried, whether the film show brush marks or roller patterns. Flow leveling is measured at 25° C., according to ASTM Standard D4062-99, a scale of from 1 to 10, with 10 being the best flow/level characteristics. If the rheology profile is flawed such that the paint is too stiff, brush marks may be left when the paint is applied to a substrate.

Conversely, if the rheology profile of an aqueous latex paint is such that the paint is too thin, the paint may be drippy when applied to substrate, such that the point film will run unacceptably. This is known as "sag", and the capacity of a paint to remain where applied rather than run or drip is called "sag resistance". This property can be measured in different ways, but for purposes of the present invention is determined using a Leneta anti-sag matter. The higher the index number is, the better the sag resistance is. Different sag resistance may be dictated by different applications. In general, for architectural paints, an index number of 11 and above is considered to have excellent sag resistance. An index number from 8-10 has moderate or good sag resistance. An index number of 7 or below may cause significant drippings or running of paints on the substrates during application.

The gloss or the gloss finish of a dried paint surface indicates the level of shininess or glass-likeness of the surface. The level of gloss ranges from flat/matte to high gloss. The gloss of a surface can be described as the reflection of light from the surface that is independent of color. To measure gloss, a single beam of light is deflected off the surface at a particular angle into a receptor, and discussed in http://www.paintinfo.com/mpi/approved/sheen.shtml, which is incorporated herein by reference in its entirety. The receptor gauges the intensity of that light in gloss units. The equipment is standardized with specially produced, polished, glass or ceramic tiles. ASTM method D 523 provides the procedures for performing this gloss test.

ASTM method D 523 uses 60° angle for comparing surface glosses and to determine whether other angles such as 20° and 85° are warranted. The 20° angle is used when the surface sample has a 60° gloss value greater than 70 gloss units, and the 85° is used if the 60° gloss value is less than 30 gloss units. The angle is measured from a vertical axis, e.g., a 60° angle is measured from the vertical line or the 0° line, and the 60° angle is 30° above the surface being tested. Gloss is measured on a 3-mil draw down.

Commonly, the term sheen is used to describe the low angle gloss, e.g., 850 from vertical or 5° above the surface to be measured. The 85° angle is preferred in measuring low gloss coatings, and is generally a more accurate indicator of the transition between flat and eggshell. Steep angles, such as 20°, are more often used with a high gloss surface such as automotive coatings.

The Master Paint Institute (MPI) categorizes the gloss finishes of paints in term of gloss units (GU) as follows:

| The Reflectivity of Paints with Different Gloss at Different Angles | | | |
|---|---|---|---|
| Type of Paint Finish | 20° Gloss | 60° Gloss | 85° Gloss |
| High Gloss | 20-90 | 70-85+ | — |
| Semi-Gloss | 5-45 | 35-70 | — |
| Satin | — | 20-35 | min. 35 |
| Eggshell | | 10-25 | 10-35 |
| Flat/Matte | | 0-10 | max. 35 |

Higher gloss values indicate shinier surfaces.

Contrast ratio is measured on a 3-mil draw down dried overnight with a spectrophotometer. Contrast ratio (C/R) is a measurement of the hiding power (or opacity) of a paint. C/R is measured in accordance with ASTM D2085-88 "Standard Test Method for Hiding Power of Paints by Reflectometry." When two coats with the same C/R are applied, a C/R of at least 95% of each coat is considered acceptable. The overall C/R of at least 99%, and more preferably 99.5%, is considered acceptable for two or more coats of dry film.

Block resistance, or the propensity of a coating to adhere to itself instead of to its substrate, was measured according to a modified version of ASTM D4946. On a sealed white Leneta™ WK card, three 9"-wide draw down coatings of samples of about 3 mils thickness were prepared side by side and allowed to cure for about 1 week at room temperature (e.g., from about 20-25° C.). After curing, each of the three draw down coating samples was cut into four 1" squares. Two of these squares were oriented face to face (i.e., coated sides touching) and are placed under a 100-gram weight in a 120° F. oven for about 24 hours. The other two of these squares were oriented face to face and placed under a 100-gram weight at room temperature for about 24 hours. Both sets of face to face squares were then allowed to equilibrate to ambient temperature for about ½ hour. Each set of squares was then pulled apart using a slow and steady force, forming a T pattern. Block resistance was rated on a scale of 1 to 5, with 1 representing no tackiness (which includes both the sound and the feel of separation upon peeling), 2 representing a slight tackiness, 3 representing a moderate tackiness, 4 representing a high level of tackiness, and 5 representing transfer of at least a portion of one of the coatings away from its substrate and onto the other coating. The relative percentage of transfer of the coating was also noted.

Water sensitivity was measured on 3-mil draw down dried for 7 days. Water sensitivity was tested with a few drops of water on the paint surface for a minute. The water was wiped off and wetted surface was scratched with finger nails to check the hardness of the film. The rating is from 1 to 5, with 5 being the hardest film, indicating its being least water sensitive.

The wet adhesion test determines the intermediate adhesion of a water base coating prior to full cure. A 3-mil drawdown is prepared on a substrate and dried. Afterward the sample is placed in a 100% relative humidity for one hour. The sample is then inspected for blisters or other blemishes. Fingernail scratch or thumb rub test can be used to check for adhesion. A cross hatch test according to ASTM D3359 method B can also be used after the sample dried. The adhesion ratings range from 0 through 5, based on the relative percent area of flaking/peeling within the 6×6 crosshatch area. 5=no flaking; 4=less than 5% flaking; 3=5–15% flaking; 2=15–35% flaking; 1=35–65% flaking; 0=more than 65% flaking. This test is conducted at 72° F. and 50% RH.

The wet scratch resistance test can also be performed on these panels by scratching the coated substrates with a fingernail, after they had been prepared for wet adhesion testing, respectively. Passing these tests involved the coatings having substantially no scratching (e.g., not more than about 5%, based on scratching length and/or surface area of the coating), including substantially no delamination from the substrate (e.g., not more than about 10%, based on coating surface area), upon gentle scratching via a fingernail.

Color transfer (or color rub-off) for paints tinted with colorants of red oxide were measured on 3-mil draw down dried for 7 days. The color rub-off is measured with a spectrophotometer and the measurements are ΔE in CIE2000 units with lower values being the better resistance to color transfer. In the examples shown above, none of the color transfer/rub-off readings would be visible to the human eyes.

While it is apparent that the illustrative embodiments of the invention disclosed herein fulfill the objectives stated above, it is appreciated that numerous modifications and other embodiments may be devised by those skilled in the art. One such modification is that . . . . Therefore, it will be understood that the appended claims are intended to cover all such modifications and embodiments, which would come within the spirit and scope of the present invention.

We claim:

1. An aqueous latex architectural composition comprising an optional opacifying pigment,
a film forming latex resin, and
a non-film forming polymeric open time additive, wherein said additive has a number average MW from about 7,000 Daltons to about 20,000 Daltons, and a Tg from about 100° C. to about 200° C. and said additive comprises at least one hydrophilic monomer and at least one polymerizable glycol monomer,
wherein the aqueous latex architectural composition is basic and said additive is dissolved in the aqueous latex architectural composition.

2. The aqueous latex architectural composition of claim 1, wherein the number average MW of the open time additive ranges from about 8,000 Daltons to about 15,000 Daltons.

3. The aqueous latex architectural composition of claim 2, wherein the number average MW of the open time additive ranges from about 9,000 Daltons to about 13,000 Daltons.

4. The aqueous latex architectural composition of claim 1, wherein an acid number of the open time additive ranges from about 130 to about 350.

5. The aqueous latex architectural composition of claim 1, wherein the open time additive has a Hansch parameter from about 0.500 to about 1.500.

6. The aqueous latex architectural composition of claim 1, wherein the open time additive has a Hansch parameter from about 0.750 to about 1.350.

7. The aqueous latex architectural composition of claim 1, wherein open time additive has a Hansch parameter from about 1.000 to about 1.250.

8. The aqueous latex architectural composition of claim 1, wherein the at least one polymerizable glycol monomer in the open time additive comprises a methoxy polyethylene glycol.

9. The aqueous latex architectural composition of claim 1, wherein the open time additive has a polydispersity index from about 1.05 to about 1.35.

10. The aqueous latex architectural composition of claim 1, wherein the open time additive has a polydispersity index from about 1.10 to about 1.3.

11. The aqueous latex architectural composition of claim 1, wherein the open time additive has a polydispersity index from about 1.15 to about 1.25.

12. The aqueous latex architectural composition of claim 1, wherein the open time additive has a polydispersity index from about 1.10 to about 1.35.

13. The aqueous latex architectural composition of claim 1, wherein a total amount of solids in the non-film forming polymeric open time additive makes up from about 1.5 wt. % to about 2.0 wt. % of total solids in the paint composition.

14. The aqueous latex architectural composition of claim 1, wherein a total amount of solids in the non-film forming polymeric open time additive makes up from about 1.6 wt. % to about 1.9 wt. % or from about 1.65 wt. % to about 1.8 wt. % of total solids in the paint composition.

15. A copolymer open time emulsion latex comprising
at least one hydrophilic monomer and at least one polymerizable glycol monomer,
wherein the latex has a Mn from about 7,000 Daltons to about 20,000 Daltons, a Tg from about 100° C. to about 200° C. and a volume average particle size from about 130 nm to about 230 nm,
wherein the latex is dissolvable in a basic aqueous solution.

16. The copolymer open time emulsion latex of claim 15, wherein the number average MW ranges from about 8,000 Daltons to about 15,000 Daltons.

17. The copolymer open time emulsion latex of claim 16, wherein the number average MW ranges from about 9,000 Daltons to about 13,000 Daltons.

18. The copolymer open time emulsion latex of claim 15, wherein the volume average particle size ranges from about 140 nm to about 220 nm.

19. The copolymer open time emulsion latex of claim 18, wherein the volume average particle size ranges from about 150 nm to about 210 nm.

20. The copolymer open time emulsion latex of claim 15, wherein the open time additive has a Hansch parameter from about 0.500 to about 1.500.

\* \* \* \* \*